US011477615B2

(12) United States Patent
Sullivan

(10) Patent No.: US 11,477,615 B2
(45) Date of Patent: Oct. 18, 2022

(54) ALERTING MOBILE DEVICES BASED ON LOCATION AND DURATION DATA

(71) Applicant: HEWLETT PACKARD ENTERPRISE DEVELOPMENT LP, Houston, TX (US)

(72) Inventor: Sean Perry Sullivan, Fayetteville, GA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 57 days.

(21) Appl. No.: 17/086,234

(22) Filed: Oct. 30, 2020

(65) Prior Publication Data

US 2022/0141620 A1 May 5, 2022

(51) Int. Cl.
*H04W 4/029* (2018.01)
*H04W 8/08* (2009.01)

(52) U.S. Cl.
CPC .............. *H04W 4/029* (2018.02); *H04W 8/08* (2013.01)

(58) Field of Classification Search
CPC ... H04W 4/029; H04W 8/08; H04W 28/0942; H04W 28/095; H04W 52/0258; H04W 52/288; H04W 88/00; H04W 88/02; H04W 88/08; H04W 92/08; H04W 92/10; H04W 80/00; H04W 80/04; H04W 76/00; H04W 76/10; H04W 76/11; H04W 72/121; H04W 72/1231; H04W 60/04; H04W 12/64; H04W 12/69; H04W 12/72; H04W 12/79; H04W 12/65; H04W 12/76; H04W 12/80;
(Continued)

(56) References Cited

U.S. PATENT DOCUMENTS 10,198,779 B2   2/2019 Pittman et al.
2010/0146583 A1* 6/2010 Prehofer et al. .................. 726/1
(Continued)

OTHER PUBLICATIONS

Bluedot, "BlueDot's Outbreak Risk Software Safeguards Lives by Mitigating Exposure to Infectious Diseases That Threaten Human Health, Security, and Prosperity," retrieved online Apr. 6, 2020, https://bluedot.global/.

(Continued)

*Primary Examiner* — Meless N Zewdu
(74) *Attorney, Agent, or Firm* — Sheppard Mullin Richter & Hampton LLP

(57) ABSTRACT

Systems and methods are provided for correlating a person/event of interest with other persons based on mobile device usage/location. Personally identifiable information can be kept hidden/obfuscated to protect user privacy in the case of a person of interest, as well as persons correlated to that person/event of interest. Information can be anonymized and posted for sharing with mobile device service providers, such as cellular carriers. A remotely-executed and customizable correlation engine can identify those cellular subscribers that were near/in the same location as the user. A notification alert can be sent, e.g., via an Amber Alert-like system to cellular subscribers that have been in proximity to the user or known areas in which events-of-interest have occurred. Location-based datasets can be flattened into an optimized data structure reflecting preferred location logics, and an application programming interface (API) and obfuscation layer can be used based on the flattened datasets.

17 Claims, 8 Drawing Sheets

(58) Field of Classification Search
CPC ..... H04W 12/60; H04W 12/61; H04W 12/63; H04W 12/30; H04W 12/33; H04W 12/108; H04W 12/10; H04W 12/102; H04W 12/104; H04W 12/00; H04W 12/02; H04W 12/03; H04W 12/033; H04W 4/02; H04W 4/021; H04W 4/023; H04W 4/06; H04W 4/21; H04W 4/23; H04W 4/18; G06F 21/62; G06F 21/6209; G06F 21/6245; G06F 21/6254; G06F 21/6263; G06F 21/64; G06Q 20/381; G06Q 20/383

See application file for complete search history.

(56) References Cited

U.S. PATENT DOCUMENTS

| | | | |
|---|---|---|---|
| 2011/0320495 A1* | 12/2011 | Levy-Yurista et al. | 707/780 |
| 2013/0090133 A1* | 4/2013 | D'Jesus Bencci et al. | 455/456.2 |
| 2013/0217333 A1* | 8/2013 | Sprigg et al. | H04W 4/008 |
| 2013/0281050 A1* | 10/2013 | Agarwal et al. | 455/405 |
| 2013/0282723 A1* | 10/2013 | Petersen et al. | G06F 21/6227 |
| 2014/0095516 A1* | 4/2014 | Purdy | G06F 17/30595 |
| 2017/0264708 A1* | 9/2017 | Bell et al. | H04L 67/325 |
| 2018/0046722 A1 | 2/2018 | Thibault | |
| 2019/0182651 A1 | 6/2019 | South | |
| 2020/0042637 A1* | 2/2020 | Wu et al. | G06F 17/30622 |
| 2021/0306804 A1* | 9/2021 | Adler et al. | H04W 4/029 |

OTHER PUBLICATIONS

Kumar, M., "Using Location Data to Tackle the Coronavirus Pandemic," Mar. 30, 2020, https://geoawesomeness.com/using-location-data-to-tackle-the-coronavirus-pandemic/.

* cited by examiner

ALERTING MOBILE DEVICES BASED ON LOCATION AND DURATION DATA

DESCRIPTION OF THE RELATED ART

Information regarding people's whereabouts, contact with each other, etc. can be useful to determine in a variety of contexts, e.g., emergency warnings, contact-tracing, and the like. Such information can be gleaned from mobile device usage, which has become ubiquitous. Early on, several barriers prevented use of location solutions—accuracy, power consumption, and privacy among them. However, a previous barrier to the use of mobile device information was that location data (traditionally) was only a small fraction of the total data on the movement of persons. In recent times, accuracy has improved through both improved location triangulation from the network and by more ubiquitous use of native positioning capabilities on the mobile device itself. These changes also addressed the power concern issues which made earlier location solutions cause excessive battery drain on the mobile device for end users.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1:
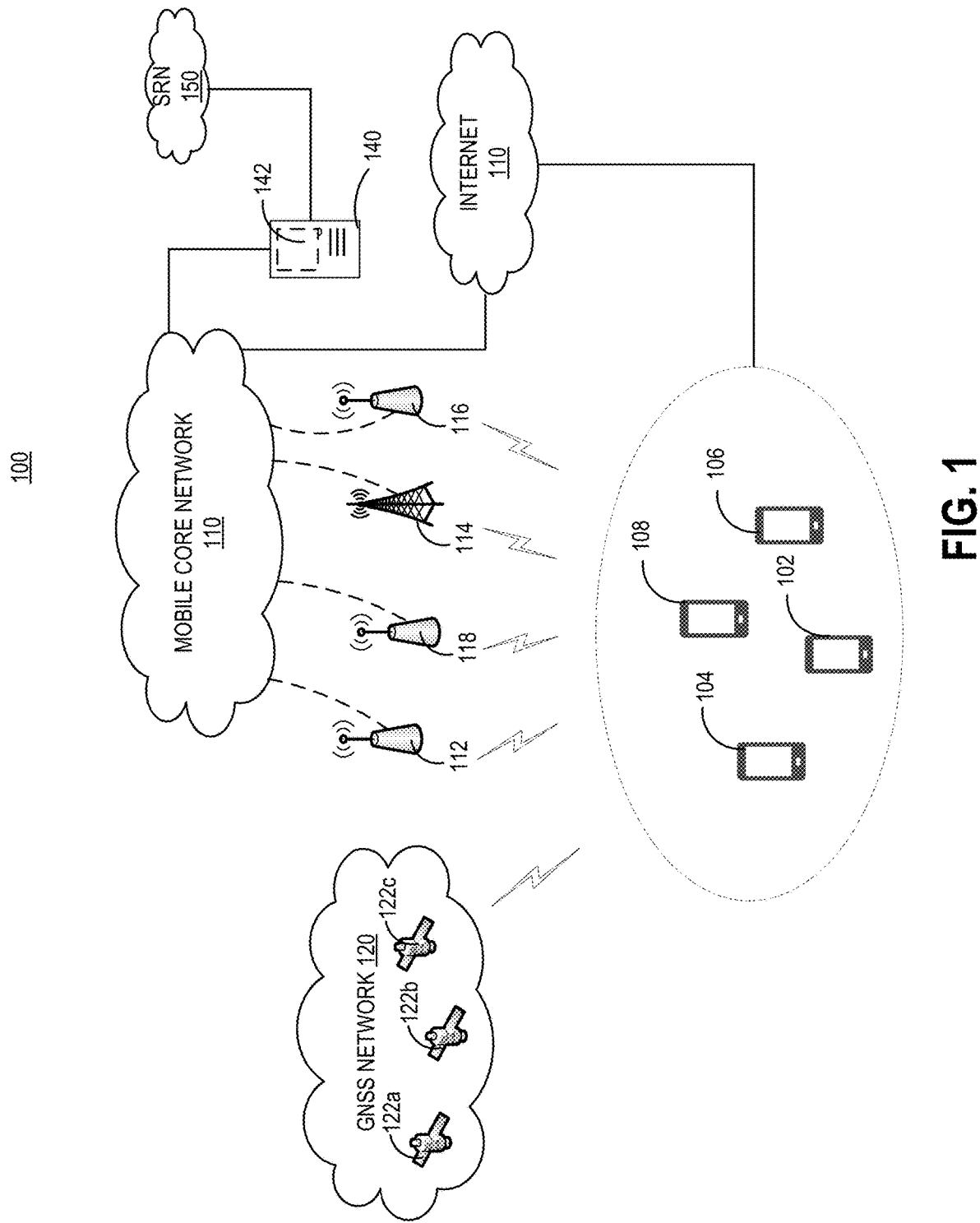
FIG. 1 illustrates an example communications network in which various embodiments may be implemented.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

As alluded to above, information regarding people's whereabouts can be obtained or derived from mobile device usage information. Although location accuracy has improved, what remains, primarily, are privacy concerns in the use of location data in conjunction with personally identifiable information (PII), as opposed to anonymized aggregated views of the location data that in absence of identifiers could not be used for targeted communications to mobile device users.

Moreover, as is the case in many contexts/scenarios, pre-emptive alerting/notification based on determined contact/presence at an event-of-interest/etc. rather than post-/after-the-fact reporting is preferable. For example, emergency systems, such as the Amber Alert system, is premised on regional notification regarding historical sightings/information of persons-of-interest. While still a viable tool for determining contact and tracking movement, the Amber Alert system is less-equipped to predict future locations/contact. That said, the Amber Alert system is representative of a system that is publicly accepted from a privacy perspective since only the service providers, e.g., cellular carriers, that broadcast alerts to cellular subscribers are aware of those cellular subscriber identities/locations.

Various embodiments are directed to a system/method, whereby a user/person-of-interest can be identified, and upon receiving consent from that user, identification information of a device(s) used by the user is collected along with related/relevant information. Once gathered from the user's provider, this information can be anonymized and posted for sharing with other mobile device service providers. A correlation engine located inside each provider can identify those cellular subscribers that were near/in the same location as the user. Location-based services/location determinative techniques, e.g., WiFi triangulation, can be used to determine the location of a user. Various mechanisms/schemes can be used to define geo-fences around locations of relevance. A notification alert can be sent, e.g., via an Amber Alert-like system to cellular subscribers that have been in proximity to the user or known areas in which events-of-interest have occurred. Such a system/method can be applied to any context where anonymized location-based information is desired.

Location-based datasets can be flattened into an optimized data structure reflecting preferred location logics. Because different carriers may have different data structures, an application programming interface (API) and obfuscation layer for mobile device identification lookup and location information retrieval can be used based on the flattened datasets. Correlation logic can be customized/determined by a relevant entity depending on the events-of-interest/users being tracked and monitored. In particular, a remotely-executable correlation model can be used, where an algorithm kernel is constructed, passed to a data collection entity, and executed within the privacy constraints of that data collection entity. This remotely executable correlation model can be instantiated within the data collection entity's information technology (IT) systems or within their remote edge locations. Model parameters can be put into priority sequences for a given analysis.

In operation, analysis metadata is defined, i.e., definitions can be established for: tracking functions; specific events of an analytic kernel; kernel version; and source/destination output pointers. The logic and sequence of execution to correlate variables is determined, as are parameter definitions for the variables, parameter ranges, and parameter data translations. It should be noted that the parameter data translations can be specific to the remotely-executable correlation model, where upon delivery of the execution logic, the entity will supply the data field mappings to the parameters within the execution kernel.

Before describing particular details of the various embodiments alluded to above, it would useful to describe a conventional wireless communication system/network in which various embodiments may be implemented. FIG. 1 is a block diagram illustrating an exemplary communication system in which various embodiments may be implemented in accordance with the present disclosure. Referring to FIG. 1, there is shown a communication system 300 which includes a plurality of mobile devices, of which the mobile devices 102-108 are illustrated. One or more of the illustrated mobile devices 102-108 can include an eco-system enabled application or applications according to various embodiments described in more detailed herein. Exemplary mobile devices may include a cellular device 102, a personal digital assistant (PDA) 104, a tablet computer 106, and/or a Smartphone 108. Also shown in the communication system 300 is a mobile core network 110, a wireless access point (AP) 112, a cellular base station (BS) 114, a Bluetooth® emitter 116, a Near Field Communication (NFC) terminal 118, a GNSS network 120, a plurality of GNSS satellites 122a-122n, an internet 130, a location server 140, and a satellite reference network (SRN) 150. One or more of the mobile core network 110, wireless AP 112, cellular BS 114, Bluetooth® emitter 116, NFC terminal 118, GNSS network 120, GNSS satellites 122a-122n, internet 130, location server 140, and/or satellite reference network (SRN) 150 can be used in assisting to determine the location of one or more of the mobile devices 102-108 for use in the eco-system enabled application and/or to provide communications links to the mobile devices 102-108 for allowing the mobile devices 102-108 to communicate as described in more detail herein with respect to an eco-system enabled application.

The wireless AP 112 may include suitable logic, circuitry, interfaces, and/or code that are operable to provide data services to communication devices, such as one or more of the mobile devices 102-108, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. The wireless AP 112 may communicate with the mobile core network 110 and/or the internet 130, via one or more links and/or associated devices for example. In this manner, the wireless AP 112 may provide network access to the mobile devices 102-108. The wireless AP 112 may also communicate with the dispenser 100 and provide the dispenser 100 the ability to communicate with the mobile devices 102-108, via the mobile core network 110 and/or the internet 130. In this manner, the dispenser 100 can provide storage status updates to a mobile device running the eco-enabled application, such as Smartphone 108.

The cellular BS 114 may include suitable logic, circuitry, interfaces, and/or code that are operable to provide voice and/or data services to communication devices, such as one or more of the mobile devices 102-108, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 114 may communicate with the mobile core network 110 and/or the internet 130, via one or more backhaul links and/or associated devices for example. In this manner, the cellular BS 114 may provide network access to the mobile devices 102-108, enabling a mobile device running the eco-enabled application, such as Smartphone 108, to communicate with the dispenser 100.

The Bluetooth® emitter 116 may include suitable logic, circuitry, interfaces, and/or code that are operable to provide Bluetooth® based connectivity to communication devices, such as one or more of the mobile devices 102-108, in adherence with various Bluetooth® and/or Bluetooth® Low Energy (BLE) standards. The Bluetooth® emitter 116 may communicate with the mobile core network 110 and/or the internet 130, via one or more backhaul links and/or associated devices for example. In this manner, the Bluetooth® emitter 116 may provide network access to the mobile devices 102-108, enabling a mobile device running the eco-enabled application, such as Smartphone 108, to communicate with the dispenser 100.

The NFC terminal 118 may include suitable logic, circuitry, interfaces, and/or code that can provide NFC-based connectivity to communication devices, such as one or more of the mobile devices 102-108, in adherence with various short range communication standards such as the Near Field Communications standards. The NFC terminal 118 may communicate with the mobile core network 110 and/or the internet 130, via one or more backhaul links and/or associated devices for example. In this manner, the NFC terminal 118 may provide network access to the mobile devices 102-108. One example implementation of an NFC terminal 119 is for use in a contactless payment system.

The mobile core network 110 may include suitable logic, circuitry, interfaces, and/or code that is operable to provide interfacing and/or connectivity servicing between access networks, which may be utilized by the mobile devices 102-108, and external data networks such as packet data networks (PDNs) and/or the internet 130. The mobile core network 110 may correspond to one or more service providers that provide, control, and/or manage network accessibility available via the mobile devices 102-108. In this regard, the mobile devices 102-108 may access the mobile core network 110 via the wireless AP 112, the cellular BS 114, the Bluetooth® emitter 116, and/or the NFC terminal 118. The mobile core network 110 may communicate various data services, which are provided by external data networks, to associated user devices such as, for example, the mobile devices 102-108. In an exemplary aspect of the disclosure, in instances where an eco-system application is provided to a user device such as Smartphone 108, the mobile core network 110 may be operable to communicate with the location server 140 to obtain location information that can be used by the eco-system enabled application.

Each of the mobile devices 102-108 may include suitable logic, circuitry, interfaces, and/or code for implementing various aspects of the embodiments disclosed herein. In this regard, each of the mobile devices 102-108 may be operable to communicate via a plurality of wired and/or wireless connections. Each of the mobile devices 102-108 may be operable, for example, to transmit to and/or receive signals from one or more of the wireless AP 112, the cellular BS 114, the Bluetooth® emitter 116, NFC terminal 118, the GNSS network 120, and/or the internet 130. Also, each of the mobile devices 102-108 may be operable to communicate with, and/or receive services provided by the internet 130 and/or the mobile core network 110. In this regard, the mobile devices 102-108 may be operable to utilize eco-system applications, which can utilize the location server 140.

The GNSS network 120 may include suitable logic, circuitry, interfaces, and/or code that may provide navigation information to land-based devices via satellite links. In this regard, the GNSS network 120 may include, for example, the plurality of GNSS satellites 122a-122n, each of which is operable to provide satellite transmissions based on a global navigation satellite system (GNSS). Exemplary GNSS systems may include, for example, GPS, GLONASS, Galileo-based satellite system, Beidou and/or Compass systems. Accordingly, the GNSS network 120 may be operable to provide positioning information via downlink satellite links transmitted from one or more of the plurality of GNSS satellites 122a-122n to enable land-based devices, such as the mobile devices 102-108, to determine their locations. The plurality of GNSS satellites 122a-122n may directly provide positioning information and/or a land-based device may utilize satellite transmissions from different satellites to determine its location using, for example, triangulation based techniques.

The SRN 150 may include suitable logic, circuitry, interfaces, and/or code that is operable to collect and/or distribute data for GNSS satellites on a continuous basis. The SRN 150 may include a plurality of GNSS reference tracking stations located around the world to provide continuous A-GNSS coverage in both a home network and/or any visited network. In this regard, the SRN 150 may utilize satellite signals received from various GNSS constellations, such as, for example, the plurality of GNSS satellites 122a-122n of the GNSS network 120.

The location server 140 may include suitable logic, circuitry, interfaces, and/or code that are operable to provide and/or support location based services (LBS). In this regard, the location server 140 may be operable to store and/or process location related information pertaining to communication devices in the system 300, such as one or more of the mobile devices 102-108. The location information may be stored in a location reference database 142 in the location server 140. The location server 140 may be operable to collect and/or retrieve location information from communication devices. The location server 140 may also be operable to access additional and/or dedicated entities, such as the SRN 150 for example, to collect GNSS satellite data, and may be operable to utilize the collected GNSS satellite data to generate GNSS assistance data (A-GNSS data) including, for example, ephemeris data, long term orbit (LTO) data, reference positions and/or time information. The location server 140 may communicate the stored location data when requested to do so.

In operation, the location server 140 may be utilized to provide location based services (LBS) in the system 300, such as locating and/or providing directions to a nearby store, e.g., store 360. The location server 140 may maintain, for example, the location reference database 142, which may include elements corresponding to each of the mobile devices 102-108. The location server 140 may access the SRN 150 to collect GNSS satellite data, and may utilize the collected GNSS satellite data to generate GNSS assistance data (A-GNSS data) pertaining to the mobile devices 102-108. The location server 140 may also collect and/or retrieve location information directly from the mobile devices 102-108, and/or from other associated entities that interact with the mobile devices 102-108 in the system 300, such as, for example, the wireless AP 112, the cellular BS 114, the Bluetooth® emitter 116, and/or the NFC terminal 118. The retrieved location information may be stored in the location reference database 142 in the location server 140. The location server 140 may communicate the stored location data, e.g., when requested to do so. The location reference database 142, maintained in the location server 140, may be modified, refined, and/or updated using retrieved location information. The location information stored and/or maintained by the location server 140 may be utilized to augment and/or substitute for location information received and/or generated based on communication with the GNSS network 120, for example, when communication with the GNSS network 120 is disturbed.

The location data may also be locally generated, and/or maintained thereafter by devices and/or entities other than the location server 140. In this regard, location related data, which typically may be generated and/or maintained by the location server 140, may be locally generated, maintained, and/or used by the mobile devices 102-108, and/or by service providers thereof. Accordingly, devices and/or entities that typically may be serviced by the location server 140, such as the mobile devices 102-108, may also perform location related servicing locally. Furthermore, the locally generated and/or maintained location related data may be uploaded from the mobile devices 102-108, and/or service providers thereof, to the location server 140. Uploading the location related data may be performed periodically, on request, and/or based on configuration of the client devices or entities, and/or the location server 140 itself.

The location information stored and/or maintained in the location server 140 may be utilized to authenticate, for example, one or more of the mobile devices 102-108, users thereof, and/or locations thereof during operations performed by the mobile devices 102-108. In this regard, service providers, who may provide access servicing to the mobile devices 102-108, may contact the location server 140 to request that the location server 140 perform authentication procedures, and/or to obtain information necessary for performing the authentication procedures. The service providers may include, for example, cellular, Bluetooth®, WLAN, and/or NFC services providers. For example, a service provider of one of the mobile devices 102-108 may request authenticating the mobile device, its user, and location at a given instance. The location server 140 may then perform the necessary authentication procedures, which may be based on existing information in the location reference database 142, which is maintained by the location server 140. The location server 140 may also perform authentication procedures based on current information, which may be obtained by, for example, communicating with the mobile device, to verify its present location and/or connectivity status or parameters. In this regard, the location server 140 may communicate with the mobile device using IP packets that may be communicated via the internet 130, which may be transmitted to and/or received by the mobile device via its internet connectivity, and/or via its network access via the wireless AP 112, the cellular BS 114, the Bluetooth® emitter 116, and/or NFC terminal 118.

The internet 130 may include a system of interconnected networks and/or devices that enable exchange of information and/or data among a plurality of nodes, based on one or more networking standards, including, for example, Internet Protocol (IP). The internet 130 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

Various devices and/or user identification information may be utilized during network access and/or communications, which may be structured, allocated, and/or assigned based on the specific wired and/or wireless protocols that are used to facilitate any such network access and/or communication. For example, in GSM and/or WCDMA based networks, International Mobile Equipment Identity (IMEI) parameters may be utilized to uniquely identify mobiles devices, and these IMEI parameters may also be used and/or traced back to the mobile devices' users. Service providers may utilize the device and/or user identification information to track mobile devices and/or users. The service providers may track devices and/or users for various reasons, including, for example, billing or usage monitoring, and/or to help locate mobile devices, and/or their users, in cases of emergency and/or law enforcement purposes. Tracking of devices may also be used to provide authorized LBS and/or real-time device location information which can be utilized by location tracking, contact tracing, and notification systems, such as various embodiments described herein.

Figure 2A:
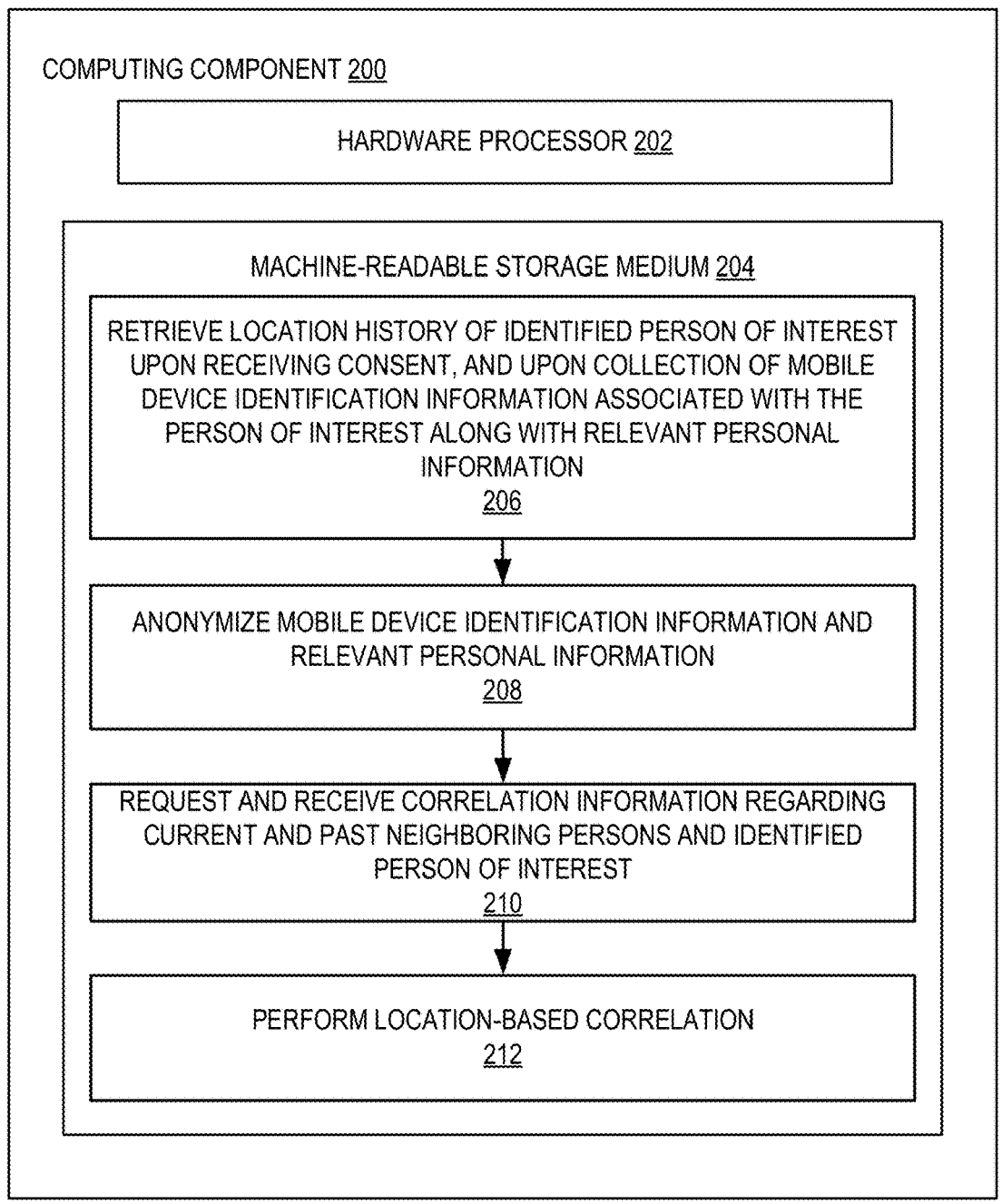
FIG. 2A is an example computing component that may be used to implement location information collection and anonymization in accordance with one embodiment of the disclosed technology.
Figure 2B:
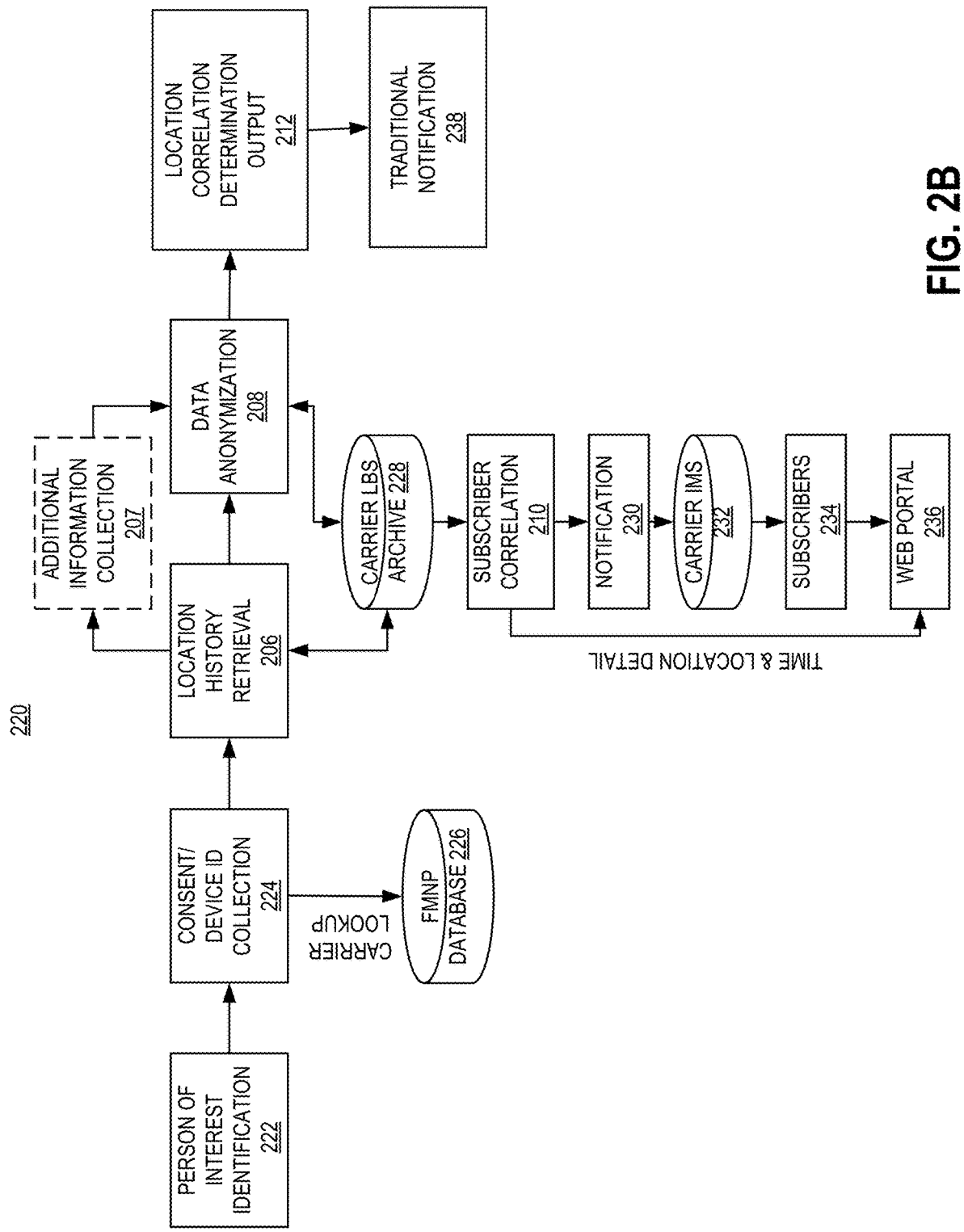
FIG. 2B illustrates an example system architecture used to implement mobile device-based alerting in accordance with one embodiment of the disclosed technology.

FIG. 2A is an example computing component 200 that may be used to implement various features of user location/contact tracking in accordance with one embodiment of the disclosed technology. FIG. 2B illustrates an example user location/contact tracking system architecture 220, and will be described in conjunction with FIG. 2A.

Computing component 200 may be, for example, a server computer, a controller, or any other similar computing component capable of processing data. In the example implementation of FIG. 2A, the computing component 200 includes a hardware processor 202, and machine-readable storage medium 204. In some embodiments, computing component 200 may be an embodiment of processor system implemented in a location information requesting entity.

Hardware processor 202 may be one or more central processing units (CPUs), semiconductor-based microprocessors, and/or other hardware devices suitable for retrieval and execution of instructions stored in machine-readable storage medium 204. Hardware processor 202 may fetch, decode, and execute instructions, such as instructions 206-212, to control processes or operations for correlating persons and/or events of interest with other persons using anonymized location-based/cellular usage information. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212. It should be understood that in some embodiments, implementation of computing component 200 may occur at, or may be part of mobile core network 110. As noted above, mobile core network 110 may correspond to one or more service providers that provide, control, and/or manage network accessibility available via the mobile devices 102-108. Various embodiments enable action(s) to be taken within individual businesses (such as service providers) to identify and/or gather information regarding events and persons of interest. One example advantage of this type of implementation, versus, e.g., the use of smartphone apps, is that users may choose not to download or not to use an app for location tracing purposes.

Hardware processor 202 may execute instruction 206 to retrieve the location history associated with an identified person of interest, e.g. upon receiving consent, and upon collection of mobile device identification information associated with the person of interest, along with relevant personal information. Referring to FIG. 2B, a person of interest may be identified at 222. Identification of a person of interest can occur through a variety of mechanisms. In the context of a missing person, identification may come through a municipal or governmental entity initiating a missing persons search/alert. In other embodiments, person of interest identification information may occur vis-à-vis a 911 dispatcher entering information into a dispatch terminal. In some embodiments, identification of a person of interest may come from citizen report, even the person of interest him/herself, e.g., in the case of self-reporting, such as in a contagion context, in which case identification may occur vis-à-vis reporting by a health care provider/system.

Collection of mobile device information along with other relevant information (with consent) at 224 may occur by way of human interviewing, requesting the person of interest or related person with authority to provide the requisite information personally, and/or through an automated mechanism, such as via website, over a communications (e.g., telephony, video conference, etc.) session, and the like. In some embodiments, and in the event consent is not received, location information may still be approximated as that where consent was sought. Mobile device information may be certain identification information, such as the user's cellular telephone number associated with his/her mobile device. Although there may be other identifying information associated with mobile devices, e.g., International Mobile Equipment Identity (IMEI) information, or the 5G equivalent, permanent equipment identifier (PEI), etc., such information can be discovered using the telephone number, and telephone numbers are more easily recalled.

In order to determine other persons that may have shared a location(s) with a person of interest or who may have been present at an event of interest, this collected information can be used to determine a carrier(s) associated with the mobile device information. Accordingly, a federal database, e.g., the Federal Communications Commission's full mobile number portability (FMNP) database 226 may be accessed with the collected information to discern what carrier is currently providing service to the cellular telephone number. Thereafter, location history retrieval can be effectuated by accessing or querying the appropriate carrier LBS archive 228 to obtain location-based services records associated with the collected mobile device information. In the context of events of interest, persons known to have been present/attended vis-à-vis guest lists, for example, may be contacted, asked for their consent, and their respective cellular telephone numbers may be used to retrieve location information (so that other persons not covered/included on such lists may be correlated and ultimately notified).

In some embodiments carrier LBS archive 228 may contain data derived from cellular telephone macro-cell location data and GPS data. The amount of data maintained in carrier LBS archive 228 can differ depending on the situation. When there is no recent event of interest for example, two weeks of rolling data may be sufficient to maintain. However, data captured across a larger time window can be maintained when a recent event of interest has occurred.

Returning to FIG. 2A, hardware processor may execute instruction 208 to anonymize the mobile device identification information and relevant personal information. In some embodiments, a cellular telephony number may be used, only initially, to retrieve prior location history associated with the mobile device. Thereafter, this mobile device identification information can be anonymized using various mechanisms, e.g., hashing, association with random index number, etc. In some examples, to protect the privacy of a subscriber, the name or any other identifying information of a user/subscriber is not shared. As will be described in greater detail below, a person of interest's cellular telephone number may be visible to a carrier only initially in order to retrieve the person of interest's location history. Afterwards, the person of interest's cellular telephone number and/or other identifying information known then (or later-obtained after accessing a carrier's LBS archive (228) may be scrubbed or otherwise anonymized. Thus, any resulting notifications sent to other users/subscribers regarding the person of interest's location, the location of an event of interest, etc. are devoid of any identifying information. In some embodiments, even the timing (precise or within some determined window) of contact with a person of interest or presence at an event of interest is not shared vis-à-vis the notifications to prevent a notified user/subscriber.

Each carrier may implement its own specific data structure(s). Thus, an API can be used by an entity, such as a health organization, a municipal or governmental enforcement agency, or any other entity interested in determining such location information to access the location history information contained in the carrier LBS archive 228 datasets. In some embodiments, the API can be configured for single and batch pulls of particular mobile device identifiers, e.g., an international mobile subscriber identity (IMSI) or similar identifier, e.g., subscriber permanent identifier (SUPI), etc. For example, for a person of interest location history retrieval, a single IMSI may be pulled by the API, whereas in the case of an event of interest-associated location history, a batch IMSI pull may be used. Thus, using the API, a requesting entity can obtain location (and time of presence/contact at a location) information associated with the person of interest or the event of interest. In addition to IMSI retrieval, media access control (MAC)-derived records indicative of WiFi usage may also be obtained.

It should be noted that carrier LBS archive 228, in some embodiments, uses the API layer as a security function by replying to queries only via the API received from a source, e.g., requesting entity, that has an appropriate encryption key. Key holders may include national or state authorities that are legally authorized to govern, e.g., tracking efforts. Encryption use can be twofold. First, preventing (via the API), the exposure of location histories of anyone not participating in tracking interviews enables dual traceability in such queries from both the originating agency and the responding carrier. Second, security governance can be established in the context of limiting those entities that are enabled to implement/run tracking queries to a list/"inventory" of legally authorized health entities. In some embodiments, the API provides an interface between a requesting entity information technology (IT)-type API call and a RADIUS/Diameter-type request typically used in telecommunications networks for accessing carrier LBS archive 228. For example, a convergent mediation mechanism/platform typically used by carriers to integrate prepaid/postpaid services over its networks can be adapted for use in obtaining the location history. The use of a Diameter message broker to retrieve both the relevant subscriber details and the location-based services history enables compatibility with the existing messaging standards governing production cellular networks. Moreover, the use of such a message broker enables the creation of a viable translation layer to adapt data formats housed within a given carrier's subscriber and/or location-based services data structures, and the standardized format used in tracking systems/apparatuses of relevant agencies.

A further, optional mechanism for securing the environment can be provided by aligning to networks using cloud implementations that can include a secure API layer, firewalled access, dedicated or air-gapped network circuits, where the cloud implementations may be instantiated with a software-defined perimeter or architecture. In other embodiments, the cloud implementation can simply involve an API bonded to matching cryptographic keys on Multiprotocol Label Switching (MPLS) routes between network nodes/elements. Ultimately, any implementation should be inaccessible via public internet pathways, and should not be vulnerable to public attempts to gain malicious access or effectuate an attack on the environment. Moreover, there should be a clear security demarcation between carrier data and any use (e.g., governmental use) of the carrier data so that other entities, like a government resource cannot access the carrier data for another purpose(s).

As one example, securing the environment can be provided by aligning to networks already secured for governmental use in FEDRAMP cloud network pathways. By placing agency applications within the FEDRAMP cloud as secured by the carrier networks, the interchange of data between the carrier message broker and the cloud recipient application can be partitioned from the public internet and/or security vulnerabilities of said networks.

Once the location of a person of interest has been determined and the personal information of the person of interest has been anonymized, that location history information can be shared with the carrier so that the carrier can effectuate subscriber correlation based on the location history information. As illustrated in FIG. 2B, and as alluded to above, a carrier's location-based services archive 228 may be accessed upon receipt of the person of interest (or event of interest) information being collected and anonymized.

In some embodiments, additional information collection at 207 can be performed by the location information requesting entity. Such additional information collection may involve refining the information regarding the person or event of interest. For example, in the case of a person who has had contact with a person fleeing custody or a kidnapee/kidnapper, an interviewer, such as an enforcement or investigatory agent may be guided to ask further questions to refine a risk vector, contact vector, etc. associated with the person or event of interest. A vector in this case may include the following: a location frequently visited by a person of interest, a location that person of interest may have recently visited for extended periods of time, a last known direction said individual was travelling when last visible to the location service, etc.

As illustrated in FIG. 2A, hardware processor 202 may execute instruction 210 to request and receive correlation information regarding current/past neighboring persons and the identified person of interest (of event of interest). Correlation in some embodiments can involve a determination regarding correlating personal contact and/or presence near a person of interest/event of interest. That is, and in the case of a carrier implementation, the carrier may correlate the presence of a person of interest to other subscribers in specific proximities for specific durations and/or in common locations if mutual presence within such common locations occurred within a defined span of time. Hardware processor 202 may also execute instruction 212 to perform location-based correlation. That is, correlation could occur at an aggregate level from a health agency as they see the results of the tracking or tracing interviews, correlating common location or events of interest that spawn or result in contact between persons of interest, for example. As such, agencies are enabled to make a decision on whether to notify all individuals/subscribers (including those who may not have been using a mobile device) that were at a given event to seek advice, testing, to notify relevant personnel of a need to address and/or perform remediation actions at such locations.

Regarding subscriber correlation, a carrier, upon receiving mobile device identification information/relevant person of interest information, may apply a correlation model/logic via a correlation engine to determine (based on a particular context around which a location history request is made) what other subscribers/users may have been co-located with the person of interest and/or also present at an event of interest. The details of such a correlation model/logic are described in greater detail below, but it should be understood that the correlation model is executed at the respective carrier(s). In this way, the location information requesting entity has no authority to access/see an underlying data set. Rather, a correlation model, which can be developed/configured by the location information requesting entity, may comprise an algorithm kernel that can be passed to the carrier(s) and executed therein. Moreover, a geo-fence can be set by the location information requesting entity to provide the boundaries/thresholds for determining subscriber correlation relative to a particular location(s).

Referring again to FIG. 2B, at 230, notifications can be sent to subscribers determined to be correlated to the person of interest/event of interest upon confirmation of a correlation to one or more other users/subscribers. For example, a carrier may transmit a message, e.g., email, short message service (SMS) message, or other notification to a mobile device of a subscriber that may have had contact with the person of interest, may have been present at the event of interest, etc. In some embodiments, the content of such notifications can vary and can be configured according to the particular context/specifics of situation. For example, the notification may contact a link to additional detail regarding, e.g., a contact location, generalized time ranges (recalling exact times of contact/presence are not revealed), as well as a provision to opt out of any further notifications. Accordingly, notifications can be sent through a carrier's IP multimedia subsystem 232 to the subscribers 234 confirmed to be correlated with the person or event of interest. A web portal 236 can be used to host the additional detail regarding the person or event of interest. It should be noted that in accordance with some embodiments, traditional notifications may be used at 238 to supplement the aforementioned notification at 230, e.g., broadcast alerts, print-based notifications, etc.

It should be noted that FIG. 2B illustrates a single carrier instance, but various embodiments contemplate the ability to retrieve location history, perform subscriber/location correlation, etc. across multiple carriers/carrier instances. For example, a person of interest may use multiple mobile devices associated with different service providers/carriers. Additionally, in order to perform accurate/complete correlation to other subscribers that may have been proximate to the person of interest and/or the event of interest, known carriers providing service in a determined location(s) may be accessed and informed so that each of the carriers may perform the requisite correlation to their own subscribers/users.

Figure 3A:
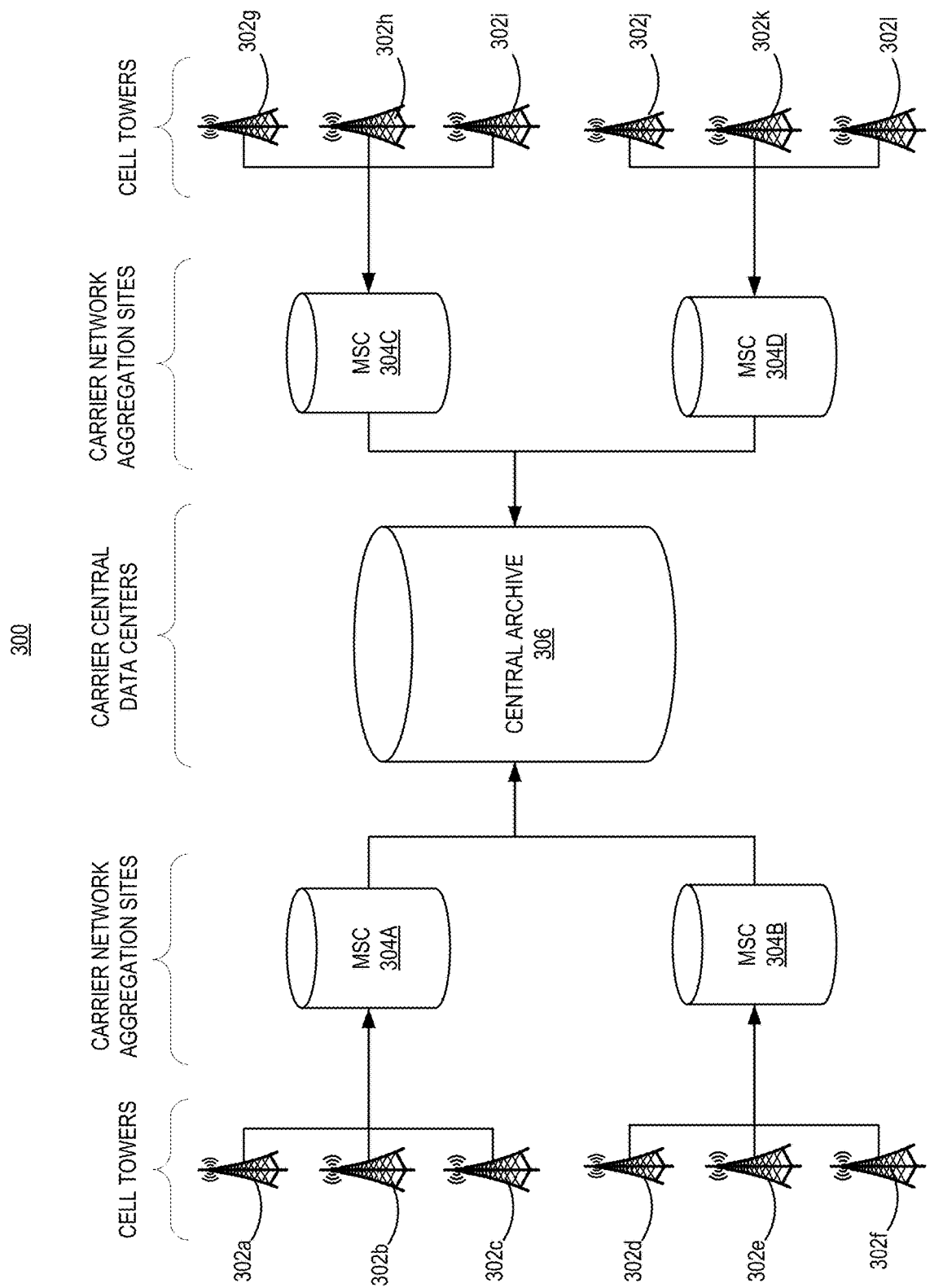
FIG. 3A illustrates an example of centralized data aggregation and collection in accordance with one embodiment of the disclosed technology.
Figure 3B:
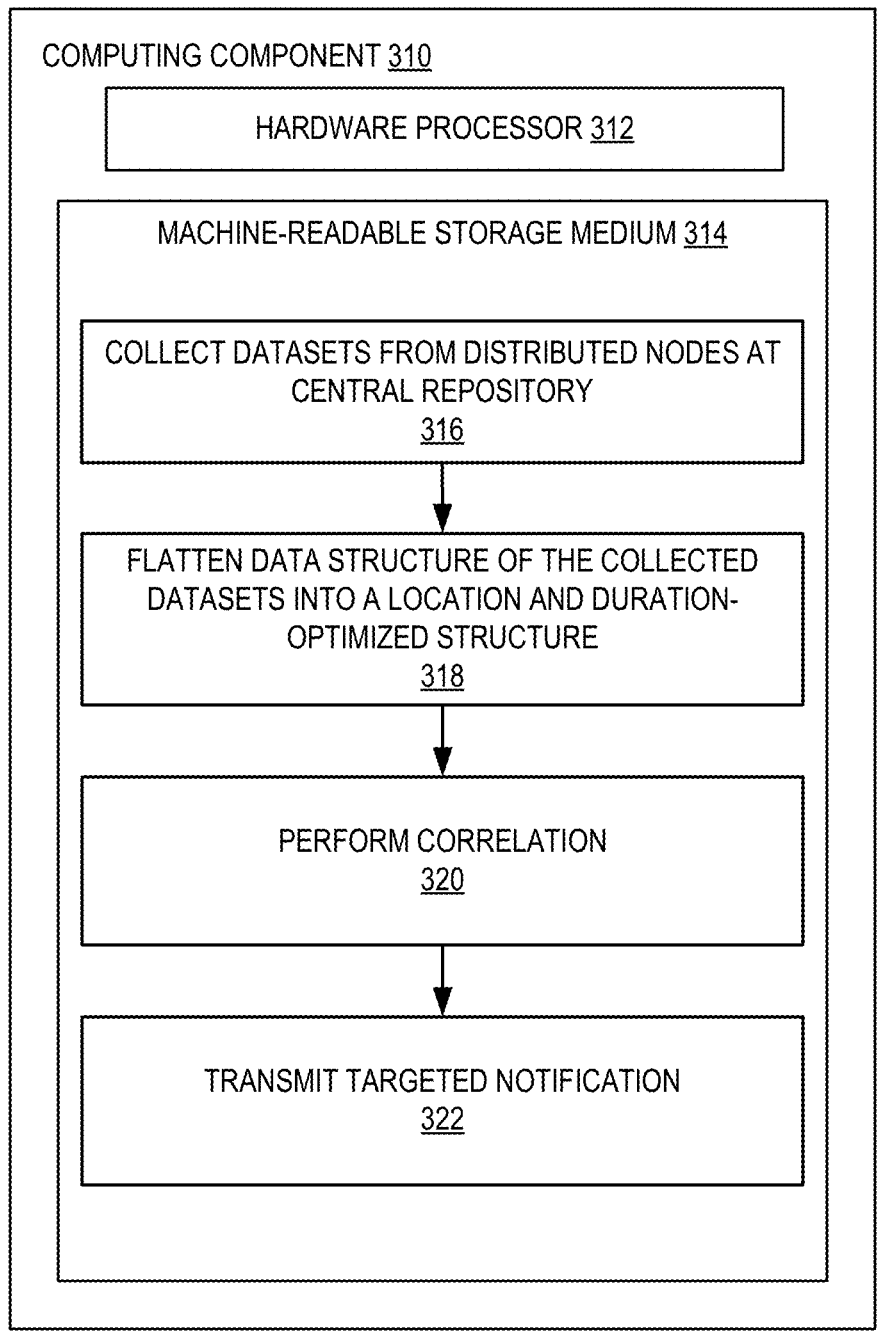
FIG. 3B is an example computing component that may be used to implement location information collection and data set flattening in accordance with one embodiment of the disclosed technology.
Figure 3C:
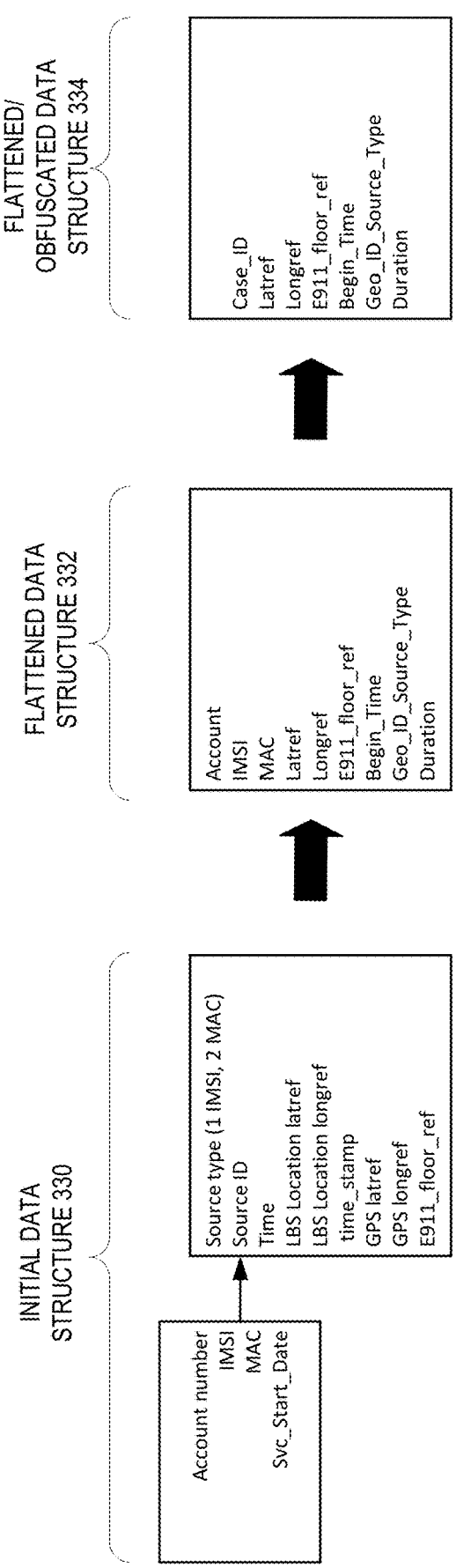
FIG. 3C illustrates an example of data set flattening and obfuscation in accordance with one embodiment of the disclosed technology.

FIG. 3A illustrates an example cellular network 300 from which a carrier LBS archive 306 (which may be an embodiment of carrier LBS archive 228) can be derived. FIG. 3B is an example computing component 310 that may be used to implement various features of user location/contact tracking in accordance with one embodiment of the disclosed technology, such as, e.g., a carrier network management server/platform. It can be assumed that carriers will seek to implement a new location-based services archive system (parallel to existing location-based services data repositories) specific to the disclosed tracking/correlation system, and to execute correlation logics local to that system. In this way, data and execution logic can be partitioned from commercial applications associated with location-based services, using regulated/mandated governance of the data in a manner that does not entangle their commercial location assets. FIG. 3C illustrates an example of data flattening in accordance with one embodiment. FIGS. 3A-3C will be described in conjunction with each other.

Computing component 310 may be, for example, a server computer, a controller, or any other similar computing component capable of processing data. In the example implementation of FIG. 3A, the computing component 300 includes a hardware processor 302, and machine-readable storage medium 304. In some embodiments, computing component 300 may be an embodiment of processor system implemented in a location information requesting entity.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-212, to control processes or operations for collecting, flattening, and obfuscating data sets, as well as transmitting targeted notifications. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312.

As noted above, the data sets required for location and subscriber correlation tend to be heavy columnar structures sitting on top of write-intensive distributed nodes across carrier network aggregation sites. Referring to FIG. 3A, cell towers 302a-302i may represent cell towers from which subscribers of a carrier may receive communications services via their mobile devices, e.g., cellular telephones. Carrier network aggregation sites may be mobile switching centers (MSCs) 304A-304D. MSCs 304A-304D may be used as carrier network aggregation sites because MSCs are generally the primary service delivery node for wireless telecommunications services, and are responsible for routing calls and other communications to/from mobile devices. Hence, information relevant or pertinent to determining locations of users or subscribers and correlating those users or subscribers to persons or events of interest can be gleaned from MSCs. As described above with reference to FIG. 1, location server 140 may be operable to store and/or process location related information pertaining to mobile devices of a carrier's network(s), and the location information may be stored in a location reference database 142 in the location server 140. Thus, MSCs 304A-304D may access this location information or this location information may be accessed through MSCs 304A-304D. MSCs 304A-304D may each offload the requisite location-based services data to central archive 306.

That is, hardware processor 312 may execute instruction 316 to collect datasets from distributed nodes at a central repository.

Referring to FIG. 3C, an initial data structure may include an account number, e.g., a subscriber account number, IMSI, MAC, and/or service start date information. That initial data structure 300 can be mapped to the following information which, as noted above, can be derived from MSC data: source type; source ID; time (duration); LBS location latitude reference; LBS location longitude reference; time stamp; GPS latitude reference; GPS longitude reference; and E911 floor reference. It should be noted that the presence of a subscriber at a location of interest may be gathered periodically, e.g. every few minutes, or continuously. Thus, the initial data structure 300 may include both a time (duration) data as well as specific time stamp data.

Once centralized, the initial data structure 330 is flattened into a flattened data structure 332. That is, hardware processor 312 may execute instruction 318 to flatten the data structure of the collected datasets into a location and duration-optimized structure. The flattened data structure 332 can be optimized for providing location and time-at-location/duration information. That is, rather than accessing multiple layers/levels of information, and having to consider mappings/relationships between different layers/levels/tuples, a single data structure can be referenced to determine location (and time) information in response to a location information request from a requesting entity. As illustrated in FIG. 3C, the flattened data structure 332 includes a single layer or table (or less than that of the initial data structure 330). Moreover, the resulting dataset may include the following information: account; IMSI; MAC; latitude reference; longitude reference; E911 floor reference; begin time (at the location); geographical ID source type; and/or duration (at the location). The geographical ID source type data can refer to the source of the location coordinates: whether they came from a Wi-Fi location, cellular triangulation, or GPS coordinates supplied by a subscriber's handset. It should be understood that each source may have a different accuracy radius, and may produce different correlation logic tolerances. Flattening of the data server to shift from having a record of each known location by the time it was gathered into specific defined periods during which a subscriber was at a particular location (in a given coordinate set). As such, what might have been a large number of rows, e.g., hundreds or thousands, for an individual who spent a significant period of time in a given location, e.g., on the order of hours, can be reduced to a single row signifying the beginning and end of their presence in a given location.

It should be noted that a particular order sequencing associated with preferred location logics in order of fine-grained location attribute can be effectuated. For instance, small-cell location based services information or distributed antenna system location based service information may be prioritized first, followed by GPS information, followed by microcell location based services information. Because RF location technologies may have different accuracies (e.g., +/−2 meters versus, e.g., +/−10 meters, for instance), when multiple location types are available, it may be preferable to use more accurate and narrower location coordinate sets rather than similar location data obtained from a source with a wider error range in the same time period.

As alluded to above, personal identifying information is to be scrubbed, hidden, or otherwise kept from the location information requesting entity (in terms of subscribers correlated to a person or event of interest) and from the carrier during the correlation phase. That is, as described above, a person of interest, for example, may be identified and a location information regarding the person of interest may be obtained. However, operations thereafter, even at the carrier level, are devoid of any personally identifiable information, e.g., so the carrier is not aware of to whom (or to what event) subscribers are being correlated. Thus, when a person of interest's location data set is retrieved pursuant to a request, the location requesting entity may provide a cross-record "case-ID" that can be transmitted to the carrier(s) for correlation and notification purposes.

That is, hardware processor 312 executes instruction 320 to perform a correlation operation. In particular, the correlation operation functions to relate a person or event of interest to one or more wireless communication carrier subscribers. As illustrated in FIG. 3C, flattened and obfuscated data structure 334 includes location and time information, but no longer includes identifying information, e.g., account number, IMSI, or MAC information.

In terms of correlation, and as alluded to above, the correlation of subscribers or users to a person or event of interest can include parameter-driven remote correlation. In conventional correlation models, queries and correlation are executed centrally. However, engines that execute correlation logic based on conventional correlation models typically have direct authority to view and query the underlying data set. In accordance with various embodiments, the correlation model/logic assumes the location information requesting entity seeking to execute the correlation has no authority to see the underlying dataset, either in full or obfuscated capacity.

Figure 3D:
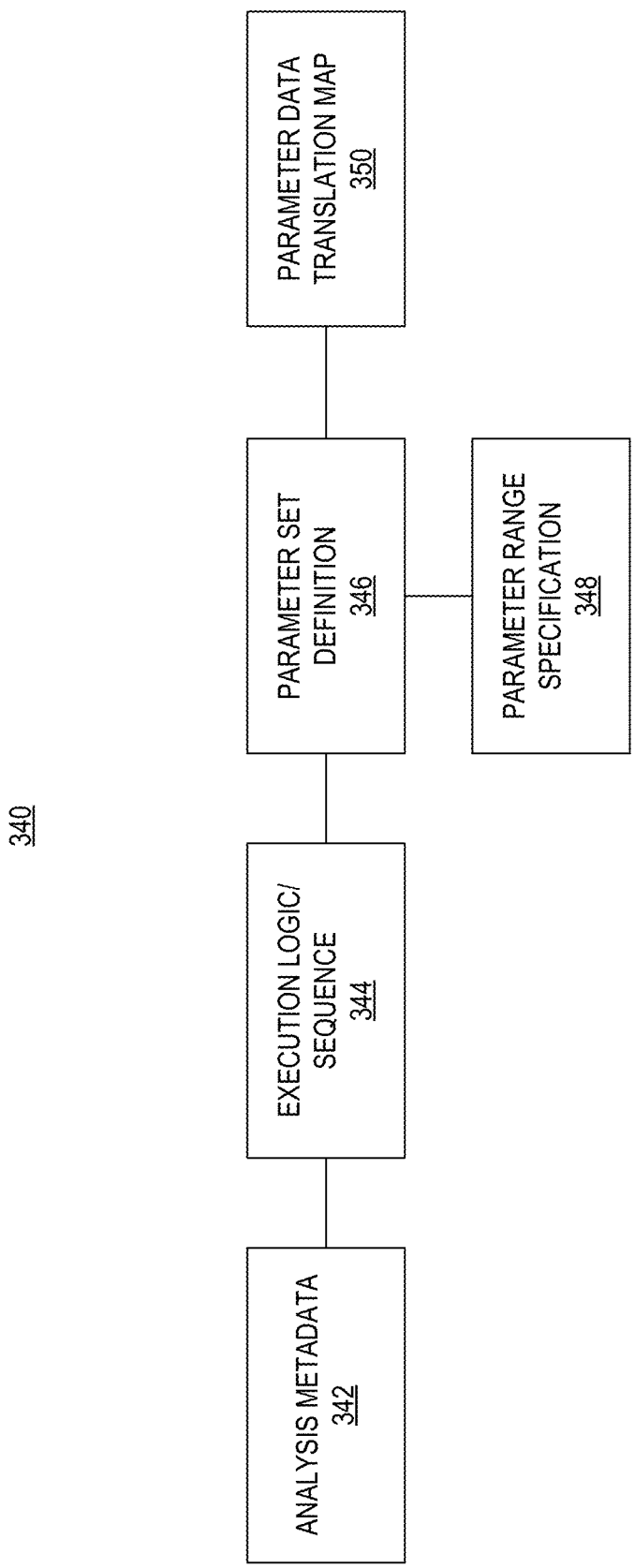
FIG. 3D illustrates an example system architecture and workflow for remotely-executable correlation in accordance with one embodiment of the disclosed technology.

In accordance with some embodiments, an algorithm kernel is constructed which can be passed to a remote location and executed within the privacy of that environment. Moreover, the contemplated correlation engine executing the remotely executable correlation model 340 (illustrated in FIG. 3D) may be configured as a set of nested execution logics, such that parameters can be modified and/or placed in different priority sequences for a given analytic run. That is, instead of passing just the parameters themselves (e.g., distance, time, duration, location type), the parameters can be passed in a specific logical ordering that might be different depending the context, event of interest, person of interest, particular request(s), etc. For example, in the case of non-contact-based event, the shared presence of two individuals in the same place at the same time can represent a correlation sequence—time and location at an equivalent level. In the case of a contact-based event, for example, the common location may be the first variable in the correlation logic, even after several hours of contact with a person of interest. By enabling the correlation algorithm kernel to specify such parameters, threshold values associated with the parameters, and the sequence by which the parameters are used in sequence, the remotely executed correlation model 340 can be adapted for use with a wide range of different scenarios.

In particular, remotely executed correlation model 340 may include an analysis metadata component 342 that can establish definitions for the tracking functions of a particular correlation run or instance. The established definitions can include definitions of specific events of this analytic kernel, the version of the kernel, and pointers associated to its source and destination outputs. Execution logic sequence 344 can refer to the code execution function of the variables/parameters to be correlated, inclusive of secondary logic that can be used when portions of source parameters are not available. A parameter set definition 346 can refer to parameter definitions for all variables included in the execution logic, while parameter range specifications 348 can refer to test values and value ranges used within an execution layer.

Parameter data translation map 350 can refer to a translation map of the parameters in the execution kernel to the data structures inside the commercial entity that will execute the correlation. This enables the use of variable data structures found in different businesses, while still enabling a common correlation logic to be executed consistently despite the variability between those business' data structures. Parameter data translation map 350 can be unspecified until the remotely executed correlation model 340 is defined and distributed, as it must be supplied by those inside the business in question based upon their mastery of their own data structures and definitions. Upon delivery of the execution logic/sequence 344 to the separate businesses into which the logic will be executed, the individual companies supply the data field mappings to the parameters within the execution kernel, completing the remote execution correlation model.

Thereafter, hardware processor 312 may execute instruction 322 to transmit a targeted notification to those subscribers or users correlated with the person or event of interest.

Figure 4:
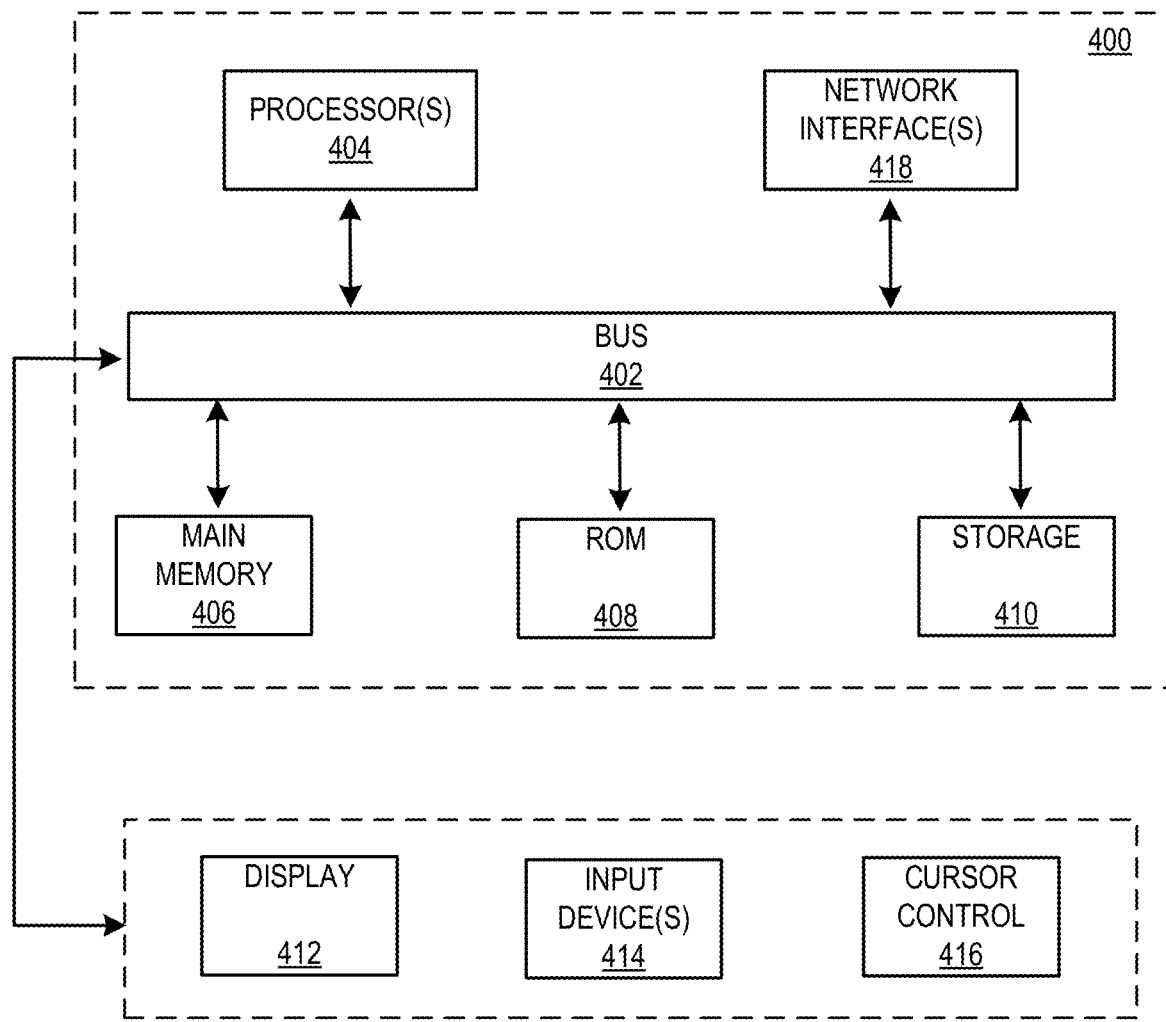
FIG. 4 is an example computing component that may be used to implement various features of embodiments of the present disclosure.

FIG. 4 depicts a block diagram of an example computer system 400 in which various embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, fons, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicate with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a processor; and
a memory unit storing computer code that when executed causes the processor to:
aggregate a plurality of location-based data elements associated with usage of a mobile device into a location and duration information dataset;
flatten the location and duration information dataset into a location and duration information dataset consumable by a plurality of entities;
anonymize the location and duration information dataset;
based on correlation logic specific to each of the plurality of entities, define a remotely executable correlation model and construct an algorithm kernel representative of the remotely executed correlation model, wherein the remotely executable correlation model comprises an analysis metadata component defining tracking functions of an executed instance of the remotely executable correlation model, event categories, algorithm kernel version, and algorithm kernel source and destination output pointers; and
execute the remotely executable correlation model at each of the plurality of entities.

2. The system of claim 1, wherein the remotely executable correlation model comprises a set of nested execution logics enabling at least one of customized modification of parameters reflecting the location and duration information dataset and customized logical ordering of the parameters.

3. The system of claim 1, wherein the customized logical ordering represents a priority sequence according to which the parameters are passed to the nested execution logics during execution of the remotely executable correlation model depending upon an event of interest or person of interest associated with the location and duration information dataset.

4. The system of claim 1, wherein the remotely executable correlation model comprises a parameter data translation component, the parameter data translation component comprising a translation map relating parameters reflecting the location and duration information dataset to entity-specific data structures.

5. The system of claim 1, wherein the computer code that when executed causes the processor to flatten the location and duration information dataset further causes the processor to generate a flattened data structure comprising a single layer location and duration information dataset reflecting mapped relationships between mobile device identifying information, and location and duration information associated with the mobile device relative to at least one of an event of interest and a person of interest.

6. The system of claim 5, wherein the computer code further causes the processor to obfuscate the flattened data structure such that the mobile device identifying information is removed from the flattened data structure.

7. The system of claim 1, wherein the aggregated plurality of location-based data elements further is obtained pursuant to determining a carrier providing service to the mobile device, and querying of a location-based services archive of the carrier.

8. The system of claim 7, wherein the querying of the location-based services archive further is performed pursuant to accessing the location-based services archive using an application programming interface (API).

9. The system of claim 8, wherein the API comprises one of a single-pull or batch-pull API, the single-pull or batch-pull API providing an interface between an information technology (IT)-type API call of the system and a message broker-type request of the carrier.

10. The system of claim 1, wherein the computer code that when executed causes the processor to execute the remotely executable correlation model further causes the processor to correlate presence of a person of interest to a subscriber of a carrier providing service to a mobile device in accordance with at least one of an entity-specified proximity and entity-specified duration.

11. The system of claim 10, wherein the computer code that when executed causes the processor to execute the remotely executable correlation model further causes the processor to correlate location of an event of interest to a subscriber of a carrier providing service to the mobile device in accordance with at least one of the entity-specified proximity and the entity-specified duration.

12. The system of claim 1, wherein the remotely executable correlation model comprises a parameter data translation component, the parameter data translation component comprising a translation map relating parameters reflecting the location and duration information dataset to entity-specific data structures set forth by an entity from which a request for historical location information was received.

13. A system, comprising:
a processor; and
a memory unit storing computer code that when executed causes the processor to:
collect datasets from distributed nodes at a central repository of a wireless communications carrier in response to receiving a request for historical location information associated with an identified person of interest or event of interest at a wireless communications carrier location-based services archive;
flatten a data structure of the collected datasets into a location and duration-optimized structure, wherein the location and duration-optimized structure comprises a single layer location and duration information dataset reflecting mapped relationships between mobile device identifying information, and location and duration information associated with each of the one or more subscribers and the event of interest of the person of interest;
obfuscate the flattened data structure such that the mobile device identifying information is removed from the flattened data structure;
correlate the person of interest or the event of interest to one or more subscribers of the wireless communications carrier; and
transmit a targeted notification to the one or more subscribers regarding the correlation.

14. The system of claim 13, wherein the computer code that when executed causes the processor to correlate the person of interest or the event of interest to the one or more subscribers of the wireless communications carrier further causes the processor to execute a remotely executable correlation model comprising an analysis metadata component defining tracking functions of an executed instance of the remotely executable correlation model, event categories, a version of an algorithm kernel instantiating the remotely executable correlation mode, and the algorithm kernel source and destination output pointers.

15. The system of claim 14, wherein the remotely executable correlation model comprises a set of nested execution logics enabling at least one of customized modification of parameters reflecting the location and duration information dataset and customized logical ordering of the parameters.

16. The system of claim 15, wherein the customized logical ordering represents a priority sequence according to which the parameters are passed to the nested execution logics during execution of the remotely executable correlation model depending upon the event of interest or the person of interest.

17. A system, comprising:
   a processor; and
   a memory unit storing computer code that when executed causes the processor to:
      aggregate a plurality of location-based data elements associated with usage of a mobile device into a location and duration information dataset;
      flatten the location and duration information dataset into a location and duration information dataset consumable by a plurality of entities;
      anonymize the location and duration information dataset;
      based on correlation logic specific to each of the plurality of entities, define a remotely executable correlation model, wherein the remotely executable correlation model comprises a set of nested execution logics enabling at least one of customized modification of parameters reflecting the location and duration information dataset and customized logical ordering of the parameters; and
      execute the remotely executable correlation model at each of the plurality of entities.

* * * * *